Patented Mar. 5, 1929.

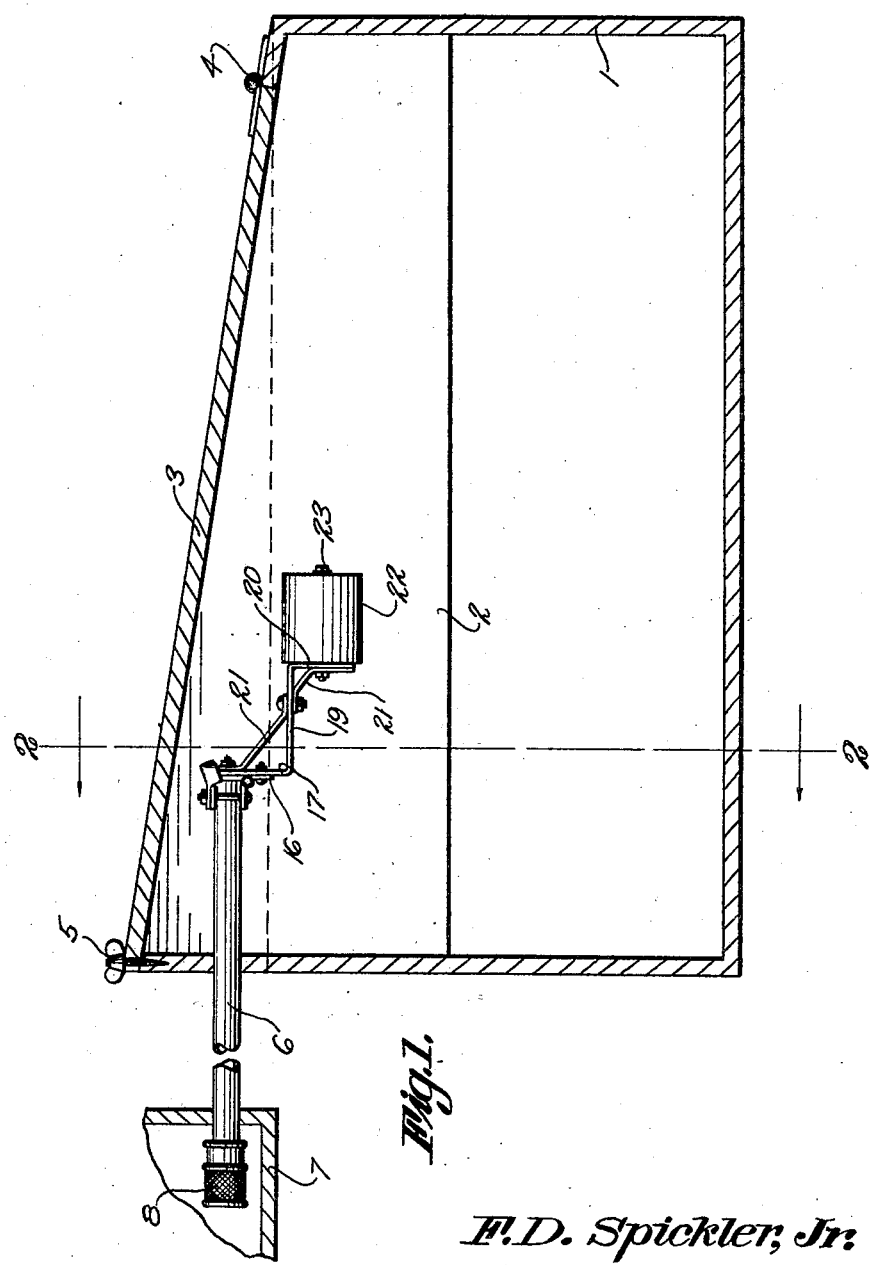

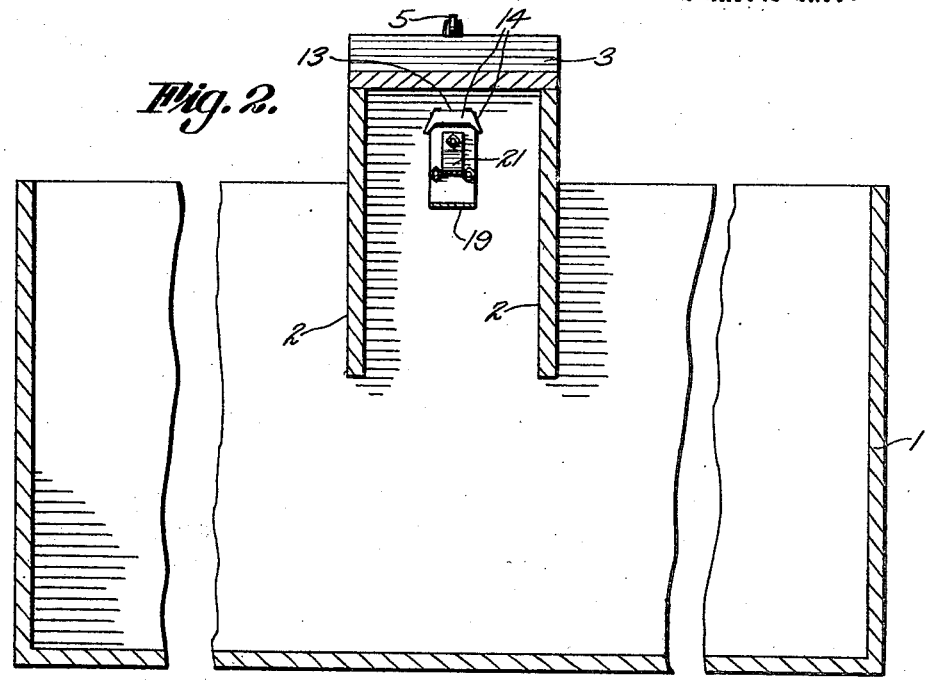
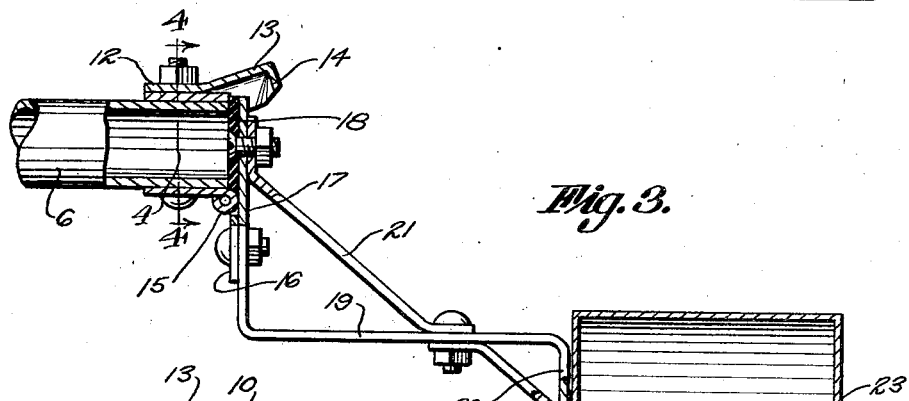
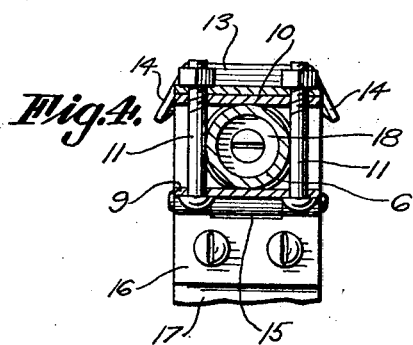

1,704,226

UNITED STATES PATENT OFFICE.

FREDDIE D. SPICKLER, JR., AND PRESTON E. SPICKLER, OF LEAF RIVER, ILLINOIS.

STOCK WATERER.

Application filed June 30, 1927. Serial No. 202,600.

This invention relates to stock waterer, comprising a trough having an intermediate housing at opposite sides of which are exposed portions of the water in the trough accessible to the stock.

One of the objects is to provide an intermediate housing of this kind in which is contained a controlling valve and a float, the housing serving to protect this mechanism from injury by the stock and also to keep floating trash away from the mechanism.

A further object is to provide a structure of this character which is simple and compact in construction and which has a means whereby access can be had readily to the valve and float mechanism should it be desired to repair or adjust the same.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings the preferred form of the invention has been shown.

In said drawings,

Figure 1 is a central vertical longitudinal section through the trough showing the valve and its float in elevation and connected to the supply pipe.

Figure 2 is a section on the line 2—2, Figure 1.

Figure 3 is an enlarged section through the valve and its float a portion of the supply pipe being shown.

Figure 4 is an enlarged section on line 4—4, Figure 3.

Referring to the figures by characters of reference 1 designates a trough of any desired proportions and erected within the upper portion of this trough at the center thereof is a housing including side walls 2 which are spaced from the side walls of the trough, leaving ample space at each side of the housing through which the stock can have access to the water contained in the trough. The top of the housing formed by the side walls 2 and the end walls of the trough is adapted to be closed by a lid 3 which can be hingedly mounted as shown at 4 and can be fastened in closed position by any suitable means such a wing nut 5 as shown in Figure 1.

The supply pipe has been indicated at 6 and opens into one end portion of the housing. This end portion of the housing is preferably higher than the other end portion, this result being obtained by making the upper edges of the walls 2 inclined upwardly toward one end so that the cover 3 is in an inclined position when closed. Pipe 6 can be extended from any suitable source of supply such as a large tank 7 located at any desired distance from the trough. It is preferred to provide the intake end of the pipe with a filtering screen shown at 8.

The outlet end of the pipe 6 is gripped between opposed clamping plates 9 and 10 adapted to be held firmly to the pipe by spaced bolts 11. These bolts also serve to bind onto the plate 10 a supplemental plate 12 from which is extended a deflecting shield 13. This shield extends over and beyond the outlet end of the pipe 6 and is provided, at its free end, with a downwardly inclined flange 14, this flange also being extended along the sides of the shield as shown.

Plate 9 is hingedly connected at 15 to a hinge member 16 fastened to a strip 17. This strip is adapted to extend across the open end of the pipe 6 and has a disk 18 of rubber, leather or the like fastened thereto so as to come against the end of the pipe and close it. In Figure 3 this pipe is shown closed by the disk. Strip 17 has an arm 19 extending at an angle therefrom and one end of this arm is extended at a right angle as shown at 20. Braces 21 can be used for strengthening the angles formed by arm 19, strip 17 and extension 20. A float 22 which can consist of a hollow metal cylinder, as shown is connected to the extension 20 by a bolt 23 extending therethrough and in the structure illustrated this bolt is also utilized for holding one of the braces 21 to the extension 20.

When the trough is partly or entirely empty the weight of the cylinder 22 and arm 19 will be sufficient to hold the valve disk 18 open or shifted away from the end of pipe 6. Consequently when water is flowing through the pipe 6 it will be discharged through the open end thereof. In view of the fact that the valve is hingedly connected at its lower portion to the pipe it will act to deflect the water upwardly as it leaves the pipe. In order to prevent this water from scattering in all directions as it issues from the pipe, the shield 13 with its flange 14 has been provided, these serving to deflect the outflowing water downwardly into the trough. Consequently even though the cover 3 should be open, there would be no danger of the water being discharged upwardly out of the trough. As the level of the water in the trough rises the float 22 will also rise and ultimately will bring the disk 18 against the end of the pipe 6 so as to shut off the supply of water. Importance is attached to the fact that the float and valve can be attached readily to an ordinary pipe inasmuch as a simple form of clamp has been provided in connection therewith, this clamp consisting of the plates 9 and 10 and the bolts 11. Thus, if desired, any one can easily construct the trough, connect a pipe thereto, and then apply the float and valve so that the apparatus will operate readily in the manner described.

By arranging the valve and float in the manner pointed out it is possible to position this trough beneath a fence with the housing directly thereunder so that the water in the trough will be accessible to stock located at opposite sides of the fence. Furthermore it leaves the full length of the trough exposed for use by the stock inasmuch as all operative parts are located at the center of the trough where they will not interfere with access to the water by the stock. The pipe 6 can of course be of any length desired and the trough thus located at any point relative to the supply.

What is claimed is:

1. The combination with a watering trough and a pipe opening thereinto, of a clamp detachably connected to the end portion of the pipe, a valve hingedly connected to the clamp, a float connected to the valve for holding said valve closed when water in the trough reaches a predetermined level, and a shield mounted on the clamp and extending over the path of the valve, said shield having a deflecting flange at the margin thereof.

2. The combination with a clamp and means for detachably securing the same to the outlet end of a pipe, of a valve hingedly connected to the clamp, an arm extending therefrom, a float movable with the arm, and a deflecting shield carried by the clamp and overhanging the path of movement of the valve.

In testimony that we claim the foregoing as our own, we have hereto affixed our signatures.

FREDDIE D. SPICKLER, Jr.
PRESTON E. SPICKLER.